United States Patent [19]
Smith et al.

[11] Patent Number: 4,747,427
[45] Date of Patent: May 31, 1988

[54] REVERSIBLE ANGLE COCK

[75] Inventors: Laurence G. Smith, Holden; Francis E. Johnson, East Harwich, both of Mass.

[73] Assignee: Princeton Corporation, Westboro, Mass.

[21] Appl. No.: 25,951

[22] Filed: Mar. 16, 1987

[51] Int. Cl.⁴ .............................................. F16K 31/44
[52] U.S. Cl. .................................... 137/270; 251/288; 251/101
[58] Field of Search ........................ 251/288; 137/270; 251/98, 99, 101

[56] References Cited

U.S. PATENT DOCUMENTS

| 596,871 | 1/1898 | Grist | 251/288 X |
| 3,184,212 | 5/1965 | Billeter | 251/288 X |
| 3,744,752 | 7/1973 | Massey | 137/288 |
| 4,559,966 | 12/1985 | Massey | 137/270 |
| 4,570,901 | 2/1986 | Holtgraver | 251/98 |

FOREIGN PATENT DOCUMENTS

| 162776 | 9/1948 | Austria | 251/103 |

Primary Examiner—Alan Cohan
Attorney, Agent, or Firm—Blodgett & Blodgett

[57] ABSTRACT

An angle cock which is capable of functioning in a left-handed mode or in a right-handed mode. The angle cock is a ball valve having a ball which is located within the curity of a housing, a valve stem and handle for selectively moving the ball to an open position and one of two closed positions, and a locking device for releasible locking the handle in the open position or in either of the two closed positions.

7 Claims, 3 Drawing Sheets

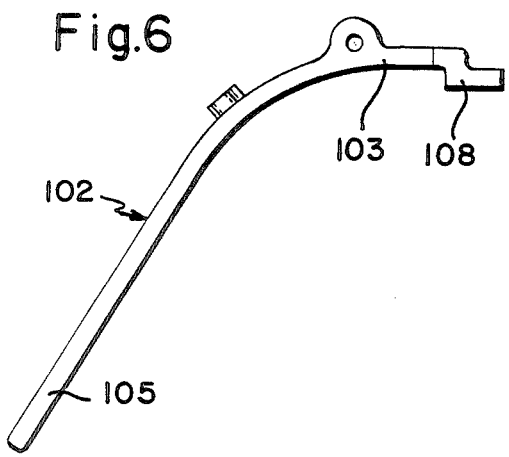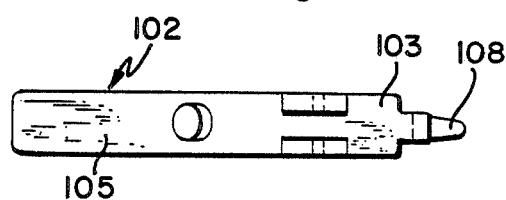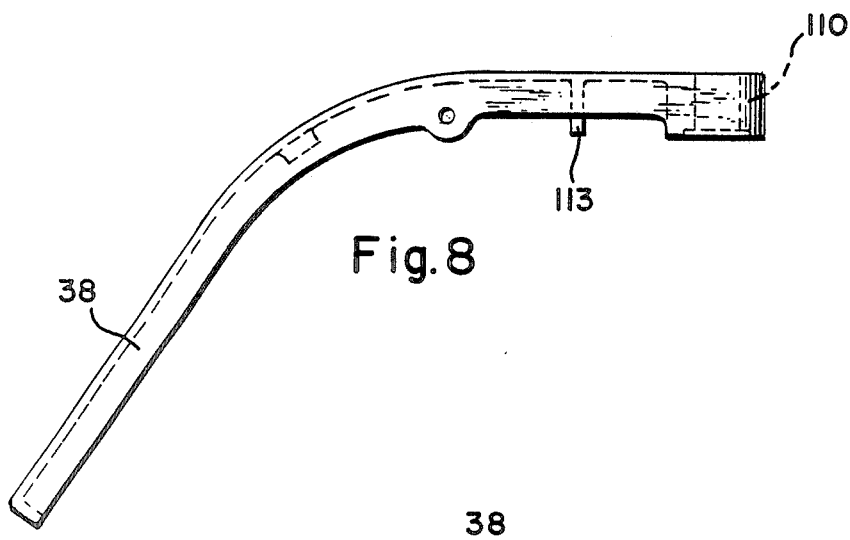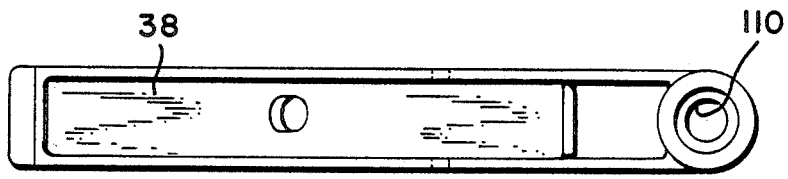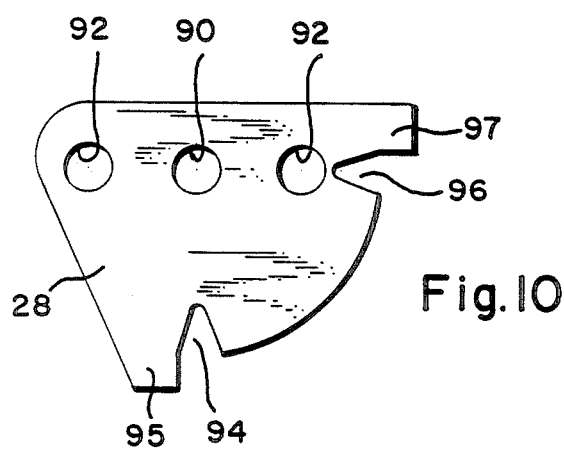

REVERSIBLE ANGLE COCK

BACKGROUND OF THE INVENTION

Angle cocks have been in use in the railroad industry for fluid flow regulation, for the last century. One particular application of angle cocks has been as a component of a freight car's brake system. The angle cock controls air brake pressure communication between brake line conduits of adjoining freight cars and locomotives.

The angle cocks in use on railroad freight cars generally include a handle, which is rotatably secured to a valve stem. The valve stem is, in turn, rotatably connected to the ball. Rotation of the handle between an open and closed position, thereby affects the orientation of the ball and fluid flow through the angle cock.

The adaptability of this type of angle cock to freight cars requires that adjoining freight cars utilize either a right-handed or a left-handed angle cock, in order to have unobstructed rotation of the handle for fluid regulation. The requirement for both right-handed and left-handed angle cocks has necessitated that railroad companies stock replacement angle cocks of each type. The storage of right-handed and left-handed angle cocks, which differ only in rotational orientation of the handle, creates an inherent logistics problem; along with the cost of maintaining adequate supplies of each type.

Application of conventional ball valves in other industries has presented similar problems as those encountered by the railroad industry. Frequently, a situation arises which requires use of a left-handed ball valve when only a right-handed ball valve is available.

These and other difficulties experienced with the prior art right-handed or left-handed angle cocks have been obviated by the present invention.

It is therefore, a principal object of the invention to provide an angle cock which can be readily adapted to a right-handed or left-handed angle cock.

Another object of the invention is to provide an angle cock which is releasably locked in either the open or closed position.

A further object of the invention is the provision of an angle cock which can be reversed for right or left hand usage by simply changing the orientation of a single component of the angle cock.

A still further object of the invention is the provision of a reversible right/left angle cock having component parts which can be manufactured inexpensively on conventional machine tools.

With these and other objects in view, as will be apparent to those skilled in the art, the invention resides in the combination of parts set forth in the specification and covered by the claims appended hereto.

SUMMARY OF THE INVENTION

In general, the invention consists of an angle cock for regulation of fluid flow which is readily adaptable for either right hand or left hand orientation. More specifically, the angle cock comprises a locking plate which is releasably mounted to the angle cock, and includes a first and second notch. A handle unit affects rotation of the ball to regulate fluid flow through the angle cock and includes a pivoted lever with a projecting element for engaging the first or second notches of the locking plate to lock the ball in an open or closed position. The locking plate is mounted to the angle cock in, alternatively, a first securement orientation or a second securement orientation. The first securement orientation establishes a right-handed angle cock with respect to the direction of rotation of the handle unit. Conversely, the second securement orientation establishes a left-handed angle cock with respect to the direction of rotation of the handle unit.

BRIEF DESCRIPTION OF THE DRAWING

The character of the invention, however may be best understood by reference to one of its structual forms, as illustrated by the accompanying drawings, in which:

FIG. 6 is a side elevational view of the component for releasing the actuating handle of the angle cock from either of its locked positions, FIG. 7 is a top plan view of the actuating handle releasing component of FIG. 6, FIG. 8 is a side elevational view of the actuating handle for the angle cock, FIG. 9 is a bottom plan view of the actuating handle of FIG. 8, and, FIG. 10 is a top plan view of the locking plate which enables the angele cock's orientation to be reversed.

DESCRIPTION OF THE PREFERRED EMBODIMENT

Figure 1:
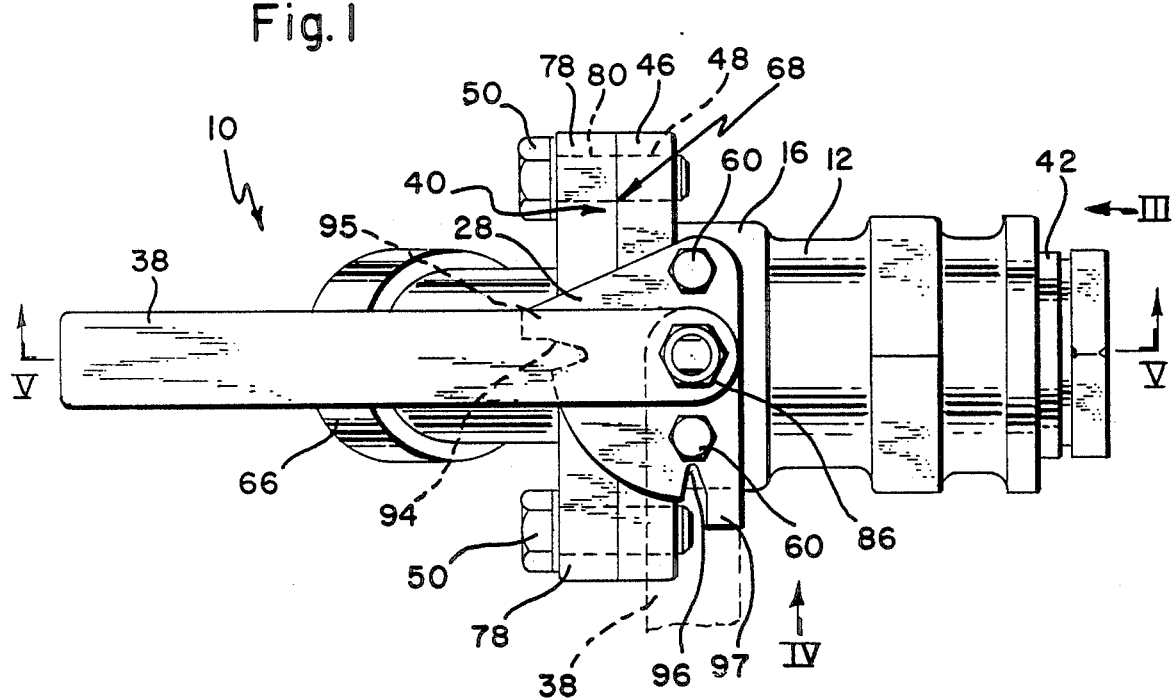
FIG. 1 is a top plan view of an angle cock embodying the principles of the present invention, showing the angle cock in a right-handed mode.

Referring to the drawings, the angle cock of the present invention is generally indicated by reference numeral 10. The angle cock 10 is provided with a body 12 having a cavity 14, a top surface 16 with an opening 18, and a valve stem bore 20 which extends from the opening 18 to the cavity 14. A ball 22 is operatively located in the cavity 14 and includes a valve stem slot 24 and a fluid flow passageway 26. The ball 22 is rotatable about the vertical axis of the valve stem bore between first closed position and a second closed position. The ball has an open position which is intermediate between the first and second closed positions. A valve stem 32 is positioned in the valve stem bore 20 and includes a bottom end 34 in driving engagement with the valve stem slot 24, for rotation of the ball 22 upon rotation of the valve stem 32. The valve stem has a top end 36 which projects above the body 12 and which includes a threaded tip 37. A handle 38 is operatively connected to the top end 36 of the valve stem 32, for rotating the valve stem 32 about the vertical axis of the valve stem bore 20 to affect rotation of the ball 22. A nut 86 is threaded to the tip 37 to maintain the handle in driving position.

The body 12 of the preferred embodiment also has a lateral surface 40, and an integral inlet fluid flow housing 42, as shown in FIGS. 1–5. The cavity 14 is provided with a recess 52, which abuts the integral inlet fluid flow housing 42, for receiving a valve seat seal 54.

Figure 5:
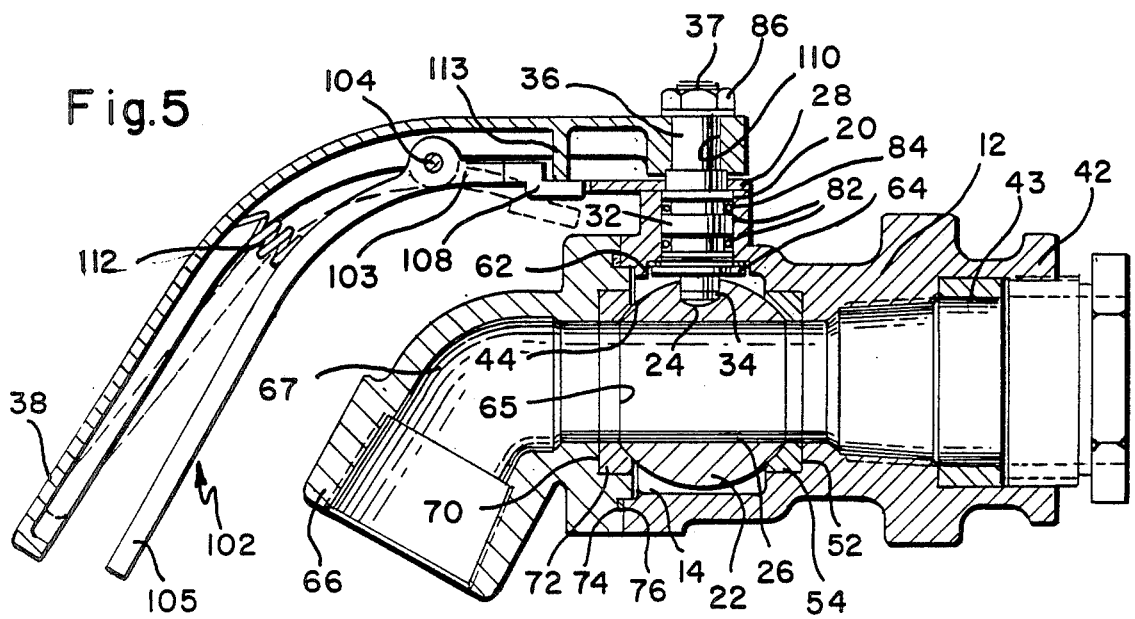
FIG. 5 is a vertical sectional view of the angle cock taken on the line V—V of FIG. 1.

The body 12 includes a pair of outwardly extending flanges 56 which extend the top surface 16. The valve stem bore 20 includes a recess 62, which abuts the cavity 14, as shown in FIG. 5. Each of the flanges 56 include a threaded aperture 58, see FIGS. 3 and 4. The lateral surface 40 is provided with a centrally disposed opening 44 and a pair of outwardly opposed securement flanges 46. Each of the flanges 46 include a threaded aperture 48. The inlet fluid flow housing 42 includes a fluid flow passageway 43 which is in communication with the fluid flow passageway 26 of the ball 22 when the ball is orientated in the open position.

Figure 2:
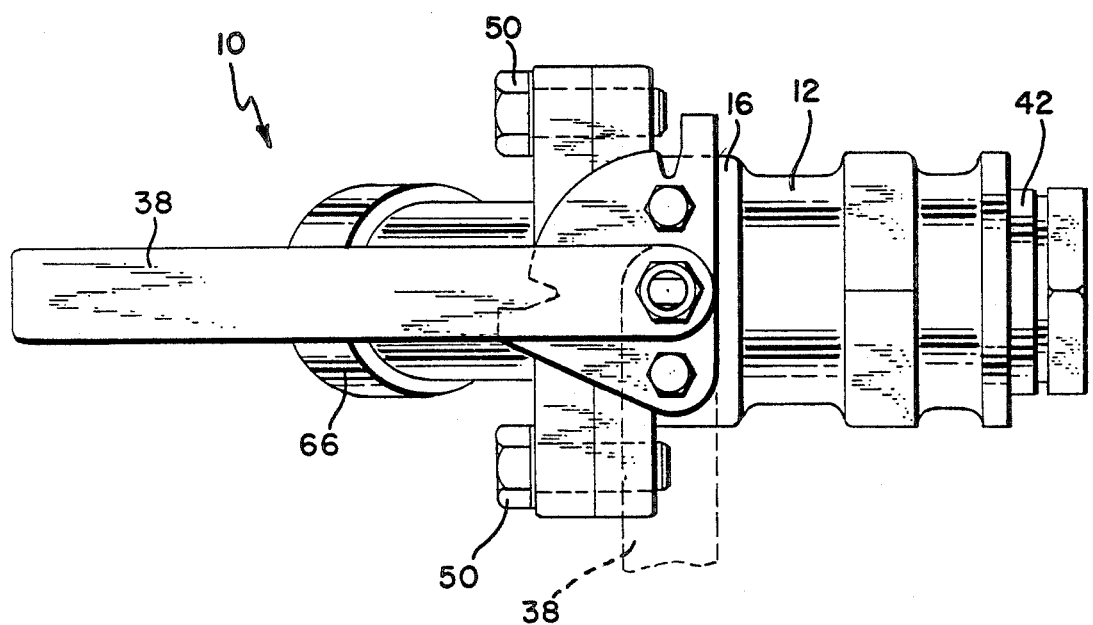
FIG. 2 is a view similar to FIG. 1, showing the andle cock in a left-handed mode.
Figure 3:
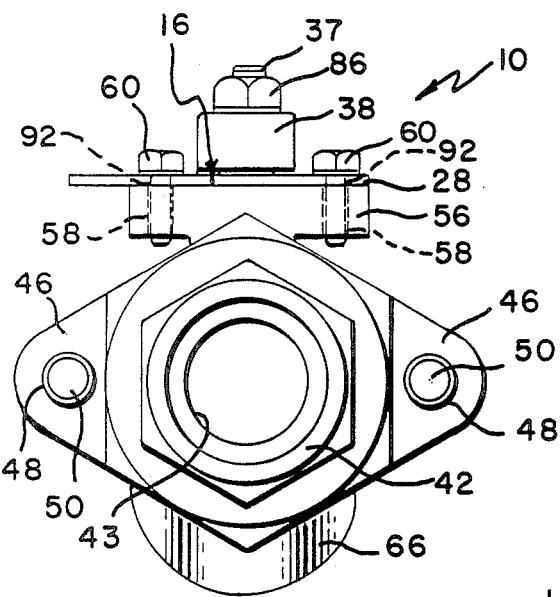
FIG. 3 is an end elevational view of the angle cock looking in the direction of arrow III of FIG. 1.
Figure 4:
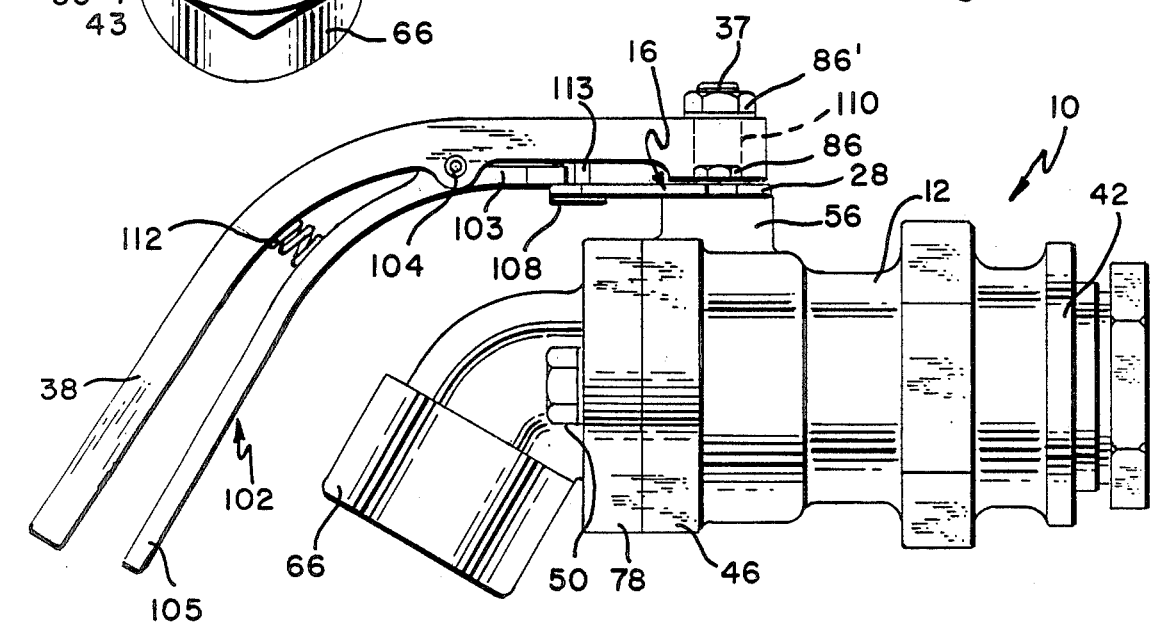
FIG. 4 is a side elevational view of the angle cock looking in the direction of arrow IV of FIG. 1.

FIGS. 1-2 and 5 show an outlet fluid flow housing 66 which is provided with a lateral surface 68 which abutts surface 40 of the body 12. The housing 66 has a fluid flow opening 65, and a recess 70 for receiving a valve seat seal 72. The housing also includes a peripheral groove 74 for receiving a sealing element 76, and a pair of outwardly opposed flanges 78. Each of the flanges 78 include an aperture 80 which is aligned with one of the apertures 48. A bolt 50 extends freely through each aperture 80 and is threaded into the corresponding aperture 48 for securing the housing 66 to the body 12, see FIGS. 1 and 2. The outlet fluid flow housing 66 includes a fluid flow passageway 67 which is in communication with the fluid flow passageway 26 of the ball 22 when the ball is in an open position.

Fluid enters the flow passageway 26 of the ball from the flow passageway 43 of the inlet flow housing 42 and exits through the flow passageway 67 of the outlet flow housing 66, when the ball 22 is orientated in the open position.

The valve stem 32 further includes a pair of circumferencing parallel grooves 82. Each groove 82 is adapted to receive a sealing element 84 for providing a sealing relationship between the valve stem and the valve stem bore 20. A thrust washer 64 is positioned in the recess 62 of the valve stem bore 20 and is engaged by the valve stem 32 to provide bearing means during rotation of the valve stem.

A locking plate 28 is bolted to the top surface 16 of the body 12 an includes a first notch 94 and a second notch 96. A first handle stop 95 is adjacent the first notch 94 and projects outwardly from the locking plate 28, and a second handle stop 97 which is adjacent the second notch 96 and projects forwardly from the locking plate 28. The locking plate 28 of the preferred embodiment further includes a valve stem aperture 90 which is vertically aligned with the valve stem bore of the body 12, and a pair of securement apertures 92 which are aligned with the apertures 58. The plate 28 is secured to the body 12 by bolts 60 which extend freely through the apertures 28 and are threaded into the apertures 58. The securement of the locking plate 28 to the body 12 may be made in a first orientation, shown in FIG. 1, or in a second orientation shown in FIG. 2. The first orientation establishes a right-handed angle cock so that the handle 38 is aligned with the first notch 94 when the ball 22 is in the open position and is aligned with the second notch 96 when the ball 22 is in the first closed position. The second orientation establishes a left-handed angle cock so that the handle 38 is aligned with the first notch 94 when the ball 22 is in the open position and is aligned with the second notch 96 when the ball 22 is in the second closed position. The handle stops 95 and 97 act to restrict movement of the handle 38 beyond the notches, while allowing movement of the handle between the notches.

A bell crank lever 102 is pivotally mounted to the handle 38 by a pivot pin 104 for pivoting about a horizontal axis. The bell crank lever 102 includes an arm 103 which extends forwardly toward the detent plate 28 and an arm 105 on the opposite side of the pivot pin 104 which extends downwardly and rearwardly away from the detent plate 28. The end of the arm 103 has a reduced width to define a forwardly projecting L-shaped tip 108. A compression spring 112 is located between the handle 38 and the arm 105 for biasing the tip 108 upwardly against a downwardly extending stop 113 on the handle 38. When the tip 108 is against the stop 113, the tip is located within the plane of the detent plate 28 as shown in FIG. 5. When the handle 38 is vertically aligned with either the notch 94 as shown in FIG. 2 or the notch 96, the tip 108 is located within the notch. When the tip 108 is located in one of the notches 94 or 96, the handle cannot be rotated to the other notch. The handle is locked in either the open position when the tip 108 is located in the notch 94 or the first closed position when the tip 108 is located in the notch 96 when the plate 28 is in its first orientation to define a right-handed cock as shown in FIG. 1.

When the handle 38 and the arm 105 are squeezed together against the biasing effect of the spring 112, the tip 108 swings downwardly out of the notch 94 or 96 so that the horizontal end portion of the tip is below the detent plate 28 as shown in dotted lines in FIG. 5. This enables the handle 38 to be moved into alignment with the other notch. When the arm 105 is released, the tip 108 moves into the other notch to maintain the handle in its new position. The vertical portion of the L-shaped tip 108 does not drop below either of the handle stops 95 or 97 even if the tip 108 is in the depressed position as shown in dotted lines in FIG. 5. The tip 108 will strike either of the handle stops 95 or 97 to prevent the handle 38 from moving beyond the notches 94 or 96. In this way the handle can only be moved between the open position or the first closed position when the plate 28 is in its first orientation as shown in FIG. 1. When the plate 28 is reversed to its second orientation as shown in FIG. 2, the handle 3 can only be moved between the open position and the second closed position to define a left-handed angle cock.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An angle cock which is capable of functioning in a right-handed mode or in a left-handed mode comprising:
   (a) a body having a cavity, a top surface which includes an opening, and a vertical valve stem bore extending vertically from said opening to said cavity,
   (b) a ball operatively located within said cavity, said ball being rotatable about a vertical axis between an open position and a first closed position and between said open position and a second closed position,
   (c) a valve stem located in said valve stem bore, said valve stem having a bottom end which is operatively connected to said ball for rotation of said ball upon rotation of said valve stem, about said vertical axis and a top end projecting above said body, (d) a handle which is operatively connected to the top end of said valve stem for rotating said valve stem about said vertical axis and rotating said ball between said open position and said first closed position which establishes said right-handed mode, for rotating said ball between said open position and said second closed position which establishes said left-handed mode, (e) a reversible locking plate which has a pair of notches which are spaced from each other, a first flat surface, and an opposite second flat surface, said locking plate being releasably mounted on the top surface of said body in said right-handed mode so that said first flat surface faces away from said top surface and so that said handle is aligned with one of said notches when said ball is in said open position and is aligned with the other of said notches when said ball is in said first closed position, said locking plate being releasably mounted on the top surface of said body in said left-handed mode so that said second flat surface faces away from said top surface and so that said handle is aligned with one of said notches when said ball is in said open position and is aligned with the other of said notches when said ball is in said second closed position, and (f) releasable detent means operatively connected to said handle for engaging in either said right-handed orientation or in said left-handed orientation said one notch for releasably locking said handle in said open position and for engaging said other notch for releasably locking said handle in said open position.

2. An angle cock as recited in claim 1, comprising a stop means for selectively preventing movement of said ball beyond either said first closed position and said open position while allowing movement of said ball between said first closed position and said open position when said angle cock is in said right-handed mode, and for preventing movement of said ball beyond either said second closed position and said open position while allowing movement between said second closed position and said open position when said angle cock is in said left-handed mode.

3. An angle cock as recited in claim 1, wherein said releasable detent means comprises:

(a) a lever having a projecting element which is adapted to engage said first and second notches, said lever being mounted on said handle for movement between a first position in which the projecting element is engaged with one of said notches when the handle is aligned with one of said notches, and a second position in which said projecting element is out of engagement with either of said notches, when the handle is aligned with one of said notches, and (b) means for biasing said lever toward said first position when said lever is aligned with one of said notches.

4. An angle cock as recited in claim 3, comprising stop means for restricting movement of said handle beyond said notches while allowing movement between said notches in either the right-handed or left-handed orientation of said locking plate.

5. An angle cock as recited in claim 4, wherein said stop means is a protrusion on said locking plate.

6. An angle cock as recited in claim 3, wherein the projecting element of said lever contacts said locking plate in said second position when said handle is out of alignment with either of said notches and is maintained in said second position by said plate when said handle is in alignment with either of said notches.

7. An angle cock as recited in claim 3, wherein said lever is a bell crank lever which is pivotally secured to said handle.

* * * * *